United States Patent [19]

Go

[11] 4,115,363
[45] Sep. 19, 1978

[54] LINEAR COPOLYESTERS OF ISOPHTHALIC ACID 4,4'-SULFONYLDIBENZOIC ACID, BIS(4-BETA-HYDROXYETHOXYPHENYL) SULFONE AND ETHYLENE GLYCOL

[75] Inventor: Santos W. Go, Toledo, Ohio

[73] Assignee: Owens-Illinois, Inc., Toledo, Ohio

[21] Appl. No.: 690,482

[22] Filed: May 27, 1976

[51] Int. Cl.$^2$ .................. C08G 63/18; C08G 63/66; C08G 63/68
[52] U.S. Cl. .................................................. 528/294
[58] Field of Search ......................................... 260/49

[56] References Cited

U.S. PATENT DOCUMENTS

| | | | |
|---|---|---|---|
| 2,593,411 | 4/1952 | Caldwell | 260/75 |
| 2,973,339 | 2/1961 | Muenster et al. | 260/47 |
| 3,536,665 | 10/1970 | Pietrusza et al. | 260/49 |
| 3,787,526 | 1/1974 | Burns et al. | 260/860 |
| 3,972,852 | 8/1976 | Inata et al. | 260/47 C |

Primary Examiner—Lester L. Lee
Attorney, Agent, or Firm—Charles S. Lynch; E. J. Holler

[57] ABSTRACT

Linear copolyesters are contemplated having the following repeating units:

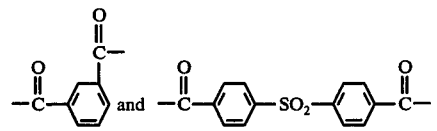

and

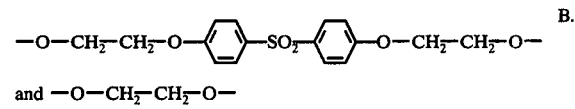

and —O—CH$_2$—CH$_2$—O— and —O—CH$_2$—CH$_2$—O— in their backbone structure. These polyesters have utility in the packaging industry for packaging various comestibles.

11 Claims, No Drawings

LINEAR COPOLYESTERS OF ISOPHTHALIC ACID 4,4'-SULFONYLDIBENZOIC ACID, BIS(4-BETA-HYDROXYETHOXYPHENYL) SULFONE AND ETHYLENE GLYCOL

Cross References

The present application is related to application U.S. Ser. No. 690,483 and U.S. Ser. No. 690,484.

The Invention

The present application is directed to polyester compositions and more specifically to linear copolyester compositions formed from saturated dicarboxylic acids and saturated glycols; yet more particularly, the invention is directed to packaging methods, and containers and packages formed from these polyesters.

Presently there is a strong interest in protecting comestibles by enveloping these comestibles, for example foodstuffs, like carbonated beverages, medicines, and the like, in packages, for example molded containers and, especially, biaxially oriented molded containers, which packages are formed from materials which comprise poly(ethylene terephthalate). Such molded containers, whether they be biaxially oriented or unoriented possess many desirable characteristics for certain products but there is a need to provide for a polyester composition which will have a glass transition temperature higher than that of poly(ethylene terephthalate) whereby containers made of such a polyester may be subjected to environments, for example higher temperatures, to which poly(ethylene terephthalate) may not be subjected. Additionally in order to achieve wider versatility in the types of products which are packaged therein, for example, comestibles, there is also a need to provide for polyester compositions which have an oxygen permeability which is lower than that of poly(ethylene terephthalate). Additionally, many products, for example carbonated beverages, need to be packaged in containers having low carbon dioxide permeability and accordingly there is also a need for providing for containers having carbon dioxide permeabilities which are lower than that of poly(ethylene terephthalate).

U.S. Pat. No. 2,593,411 suggests that polyesters may be formed from dicarboxylic acids and from bis (4-beta-hydroxyalkoxyphenyl) sulfones and that mixed polyesters can likewise be obtained by employing such sulfones in combination with other dihydric and polyhydric alcohols. British Pat. Specification No. 678,264 suggests linear polyesters formed from an aromatic dicarboxylic acid and a glycol, e.g. bis(4-beta-hydroxyethoxyphenyl) sulfone. Also in this regard, reference may be had to British Pat. Specification No. 1,196,911 which discloses the reaction of ethylene glycol with for example bis(4-chlorophenyl) sulfone and indicates that such type materials may be employed in forming polyesters. Vol. 83 of Chemical Abstracts, No. 206808s (1975) discloses polyesters being formed from 4,4'-biphenyldicarboxylic acid and aliphatic glycols and bis(4-beta-hydroxyethoxyphenyl) sulfone. Similarly Vol. 83 Chemical Abstracts Nos. 165136a and 165644q (1975) disclose the use of such sulfones with napthalene dicarboxylic acids. None of the foregoing are directed to forming polyesters having oxygen permeabilities and $CO_2$ permeabilities which are lower than that of poly-(ethylene terephthalate) and which have glass transition temperatures higher than that of poly(ethylene terephthalate).

Japanese unexamined (Kokai) Patent Publication No. Showa 50-51595 (Patent Application No. Showa 48-101837) discloses transparent, dimensionally stable, linear polyesters having high glass transition points but has no recognition, or teachings, with regard to oxygen permeability and carbon dioxide permeability. It is taught therein to employ for example bis(4-beta-hydroxyethox phenyl) sulfone, alone or with minor amounts of a glycol, and a dicarboxylic acid which is primarily terephthalic acid. In order to obtain polyesters suitable for the purposes of this patent application it is taught that, of the dicarboxylic acid, at least 70 mole percent, and preferably 80%, should be terephthalic acid and, based on the acid employed, at least 60%, and preferably 65-95%, should be the described sulfone. A wide variety of optional dicarboxylic acids which may be used in minor amounts are set forth from which it is possible to select isophthalic acid and sulfonyl dibenzoic acid. Similarly a wide variety of diols are disclosed, including ethylene glycol.

The art is generally aware of the use of 4,4'-sulfonyldibenzoic acid, or its ester, or its halides, for use as a dicarboxylic acid in the formation of linear polyesters.

In accordance with the present invention applicant has satisfied a need in the art by providing for a linear copolyester which is the polymeric reaction product of reactants consisting essentially of (A) isophthalic acid and 4,4'-sulfonyldibenzoic acid, and (B) bis(4-beta-hydroxyethoxyphenyl) sulfone and ethylene glycol. While these polyesters have numerous uses, by adjusting the amounts of the (A) reactants and the (B) reactants linear copolyesters can be formed having oxygen permeabilities, carbon dioxide permeabilities, and glass transition temperatures which will allow for their use in a wide variety of applications in the packaging industry. Generally on a mole basis the combined amounts of the (B) reactants above will be about 110 mole percent to about 300 mole percent of the combined amount of the (A) reactants.

For many applications in the packaging industry a copolyester having quite advantageous properties will be formed wherein the (A) reactants are present in an amount of about 15 mole percent to about 60 mole percent of 4,4'-sulfonyldibenzoic acid and about 85 mole percent to about 40 mole percent of isophthalic acid, and the amount of bis(4-beta-hydroxyethoxyphenyl) sulfone being between about 15% to about 90% of the combined amounts of the (A) reactants, with the amounts of the (A) and (B) reactants being sufficient to provide an oxygen permeability of less than that of poly- (ethylene terephthalate) and a glass transition temperature in excess of that of poly (ethylene terephthaalate). The percentages are based on reactant feed. Preferably, the bis (4-beta-hydroxyethoxyphenyl) sulfone will be at least 50% relative to the combined amounts of the (A) reactants.

In passing it should be mentioned that when reference is made of oxygen and carbon dioxide permeability of poly(ethylene terephthalate) it is generally considered that the homopolymer has an oxygen permeability of about 8–9 cc. mil/100 in².day.atm. and a carbon dioxide permeability of about 62 cc.mil/100 in².day.atm. when measured on pressed films. In my copending applications U.S. Ser. No. 643,282 and U.S. Ser. No. 643,283, reference is made to a carbon dioxide permeability of around 48 or 50. That figure is based on an extruded film and, as will be readily apparent, extrusion effects some orientation which in turn has the effect of reducing the permeability. Thus, the above figures contemplate, as indicated, a pressed film which is substantially unoriented. Generally the glass transition temperature of unoriented poly(ethylene terephthalate) is considered to be about 72° C.

Quite desirable linear copolyesters suitable for use in a wide variety of applications in the packaging industry is a copolyester formed as the polymeric reaction product in which the (A) reactants, on a mole basis, are about 45 to about 80% of isophthalic acid and about 20% to about 55% of 4,4'-sulfonyldibenzoic acid with the amount of the bis(4-betahydroxyethoxyphenyl) sulfone being about 60 mole percent to about 85 mole percent of the combined amounts of the (A) reactants; such polyesters will have an oxygen permeability of less than about 7.4 cc.mil/100 in$^2$.day.atm. (at about 50% relative humidity and about 73° F.) and a carbon dioxide permeability of less than about 65.6 cc.mil/100 in$^2$.day.atm. (at about 50% relative humidity and about 73° F.) and glass transition temperatures of at least about 121° C.

Quite outstanding polymers are formed as the reaction product wherein the (A) reactants are about 60% to about 80% of isophthalic acid and about 20% to about 40% of 4,4'-sulfonyldibenzoic acid with the amount of bis(4-beta-hydroxyethoxphenyl) sulfone being between about 60% to about 85% of the combined amount of the (A) reactants; such polymers will have a carbon dioxide permeability of less than about 50.3 and an oxygen permeability of less than about 7.0 and a glass transition temperature in excess of about 121° C. These polymers will be of outstanding utility for the packaging of carbonated beverages, i.e., pop, and exhibit excellent heat stability.

As indicated the present invention also contemplates molded containers which are formed from materials which comprise linear copolyesters with the copolyesters consisting essentially of the polymeric reaction product of the (A) and (B) reactants indicated hereinbefore. Biaxially oriented molded containers formed from the polyesters contemplated herein are of especially outstanding characteristics. Packages which comprise comestibles, for example carbonated beverages, medicines, and the like, enveloped in a molded container formed from materials which comprise a linear copolyester with the copolyester consisting essentially of the reaction product of the reactants indicated above will find utilization, and a flexibility of use, not possessed by that of poly(ethylene terephthalate). The present application likewise contemplates improvements in methods for protecting comestibles wherein the comestibles are enveloped in packages which are formed from the copolyesters contemplated herein.

When reference is made herein to bis(4-beta-hydroxyethoxyphenyl) sulfone and to ethylene glycol, it is contemplated that this likewise includes esters thereof as being employed for the reactants. Similarly when reference is made to isophthalic acid and to 4,4'-sulfonyldibenzoic acid that terminology likewise contemplates not only the acid but also the esters and acid halides thereof for use as reactants. Preferably in practicing the invention the ethylene glycol and bis(4-beta-hydroxyethoxyphenyl) sulfone will be used as the diol per se, whereas the diesters of isophthalic acid and the 4,4'-sulfonyldibenzoic acid will be used as the (A) reactants. These esters may be the aliphatic esters or aromatic esters with the preferred esters being the alkyl esters having from about 1-4 carbon atoms, with methyl being especially highly preferred. The phenyl esters are the preferred aromatic esters.

The polyesters as contemplated herein are synthesized by methods generally known in the art for producing polyesters. The reactants may all be reacted in a single operation by first charging them to an appropriate reactor or a sequential operation may be employed by first reacting isophthalic and ethylene glycol to form bis(beta-hydroxyethyl) isophthalate and then in turn reacting the latter with the remaining ingredients. Since, as indicated, in the preferred practice the diesters of isophthalic acid and 4,4'-sulfonyldibenzoic acid will be employed, conventional transesterification followed by polycondensation is contemplated as the preferred approach. Temperatures employed which will be quite suitable for forming the polyesters will generally range between about 200° or 210° up to about 295° C. or so, with the preferred ranges being between about 225° to about 285° C. Of course the reaction will be done under an inert atmosphere.

Conventional catalysts are likewise employed. For example transesterification is effected in the presence of effective catalytic amounts of transition metal compounds, alkaline earth metal compounds, or alkali metal compounds, for example the acetates, oxides, phenoxides, and alkoxides. Specific suitable catalysts will be, for example, zinc acetate, manganese acetate, magnesium acetate, calcium acetate, and titanium alkoxides, like titanium tetrabutoxides as well as mixed metal salts for example potassium titanium oxalate. Suitable polycondensation catalysts include, for example, antimony acetate, antimony trioxide, titanium alkoxide, and organotinoxides, for example stannous alkoxides. Usually the catalysts will be present in an amount of about $10^{-5}$ to about $10^{-3}$ moles of catalysts per mole of total acid employed.

Of course suitable adjuvants, such as antioxidants and stabilizers may be employed and they may be added directly to the reaction mass or added to the final polymer.

The linear copolyesters contemplated herein may be formed into clear packages, for example molded containers, and preferably biaxially molded containers, using conventional plastic forming techniques such as, for example, that disclosed in U.S. Pat. No. 3,733,309. These packages are ideally suited for protecting foodstuffs, for example, carbonated soft drinks and beer, or medicines, or other related substances, by simply enveloping those containers in these packages.

While the foregoing describes the present invention with sufficient particularity to enable those skilled in the art to make and use same there nonetheless follows, for exemplary purposes only, several specific examples.

EXAMPLE 1

A linear polyester was prepared having the following units in its backbone:

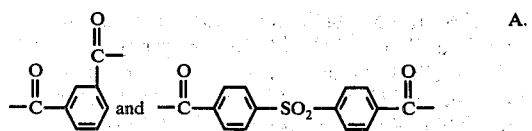

and

—O—CH₂—CH₂—O— and

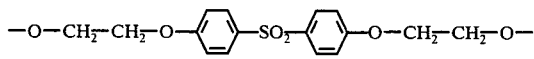

The specific reactant materials employed in the feed stock was about 0.1 mole of an admixture of dimethyl isophthalate (DMI) and dimethyl 4,4'-sulfonyldibenzoate acid(DMS) with the former being present in an amount of about .08 mole and the latter in an amount of about 0.02 mole. About .20 mole of ethylene glycol (EG) and about 0.085 mole of bis(4-beta-hydroxyethoxyphenyl) sulfone (BSE) were employed as the glycol. Additionally about $6.5 \times 10^{-5}$ mole of $Sb_2O_3$ and about $5 \times 10^{-5}$ mole of $Mn(C_2H_3O_2)_2 \cdot 4H_2O$ were employed for catalytic purposes.

The mixture of the reactants along with the catalysts were weighed into a 300 ml three-necked round bottom flask equipped with a stirrer, nitrogen inlet tube, and a condenser. The contents of the flask were heated to and held at about 225° C. for about 3 hrs. with nitrogen flowing into the reaction flask to provide a nitrogen blanket and with methanol being removed. The reactant system was then heated to about 265° C. and held there for about 45 minutes during which time additional methanol was removed. A vacuum of about 0.2 to about 0.45 mm Hg was then applied and the reactants heated to between about 275° C. to about 285° C. with ethylene glycol being removed. The system was held at that latter temperature under that vacuum for approximately 6 hours after which time the polymer was removed. Table A sets forth the glass transition temperature of the polymer and as well as the carbon dioxide and oxygen permeability of films which were pressed from that polymer. The carbon dioxide permeability and the oxygen permeability were measured on pressed films employing ASTM D-1434-66 at a temperature of about 73° F. and 50% relative humidity and is in the units cc.mil/100 in².day.atm. The glass transition temperature was measured with a Differential Scanning Calorimeter. In Table A the percentages are based on feed stock.

EXAMPLES 2-4

The procedure of Example 1 was substantially repeated using a total molar charge of the (A) reactants of about 0.1 mole with the mole percentage of the respective (A) constituents being varied as indicated in Table A. Additionally, in Example 3 instead of employing 0.085 moles of BSE there was employed about 0.060 moles of BSE and about 0.19 moles of ethylene glycol.

TABLE A

| Example | % DMI | % DMS | % BSE | Mole Ratio EG/BSE | $O_2$ | $CO_2$ | Tg |
|---|---|---|---|---|---|---|---|
| 1 | 80 | 20 | 85 | 70/30 | 5.5 | 35.4 | 121° C. |
| 2 | 60 | 40 | 85 | 70/30 | 7.0 | 50.3 | 129° C. |
| 3 | 60 | 40 | 60 | 76/24 | 5.1 | 46 | 124° C. |
| 4 | 45 | 55 | 85 | 70/30 | 7.4 | 65.6 | 135° C. |

Following the know forming procedures of the prior art, for example U.S. Pat. No. 3,733,309, a biaxially oriented molded container (i.e., a container having a bottom wall and circumferential sidewall merging with and proceeding upwardly from the bottom wall, the sidewall at its upper margin tapering inwardly and merging with a neck portion defining a mouth opening) is formed fom the above polyesters of Examples 1-4. The containers are clear and upon being filled with comestibles, for example, foodstuffs like applesauce, medicines, and the like, so as to envelope these substances, show outstanding characteristics for the packaging of such products. The organic polymers of Examples 1-3 show particularly outstanding characteristics for the packaging of carbonated beverages.

I claim:

1. A linear copolyester suitable for use in the packaging of comestibles, said polyester being the polymeric reaction product of reactants consisting essentially of
   (A) isophthalic acid and 4,4'-sulfonyldibenzoic acid, and
   (B) bis(4-beta-hydroxyethoxyphenyl) sulfone and ethylene glycol.

2. The copolyester of claim 1 wherein the combined amount of said B reactants are about 110 mole percent to about 300 mole percent of the combined amount of said A reactants.

3. The copolyester of claim 2 wherein the molar amounts of said A reactants are about 45% to about 80% of isophthalic acid and about 20% to about 55% of 4,4'-sulfonyldibenzoic acid and the amount of said bis(4-beta-hydroxyethoxyphenyl) sulfone is about 60% to about 85% of the combined amount of said A reactants, said polyester having an $O_2$ permeability of less than about 7.4 cc.mil/100 in ².day.atm., a $CO_2$ permeability of less than about 65.6 cc.mil/100 in ².day.atm. and a glass transition temperature of at least about 121° C.

4. The copolyester of claim 3, said polyester having a $CO_2$ permeability of less than about 50.3 cc.mil/100 in ².day.atm. and an $O_2$ permeability of less than about 7.0 cc.mil/100 in ².day.atm. and a glass transition temperature between about 121° to about 129° C., and A reactants being about 60% to 80% isophthalic acid and about 20% to 40% 4,4'-sulfonyldibenzoic acid.

5. The copolyester of claim 2 wherein said A reactants are present in an amount of about 15% to about 60% 4,4'-sulfonyldibenzoic acid and about 85% to about 40% isophthalic acid and the amount of said bis(4-beta-hydroxyethoxyphenyl) sulfone is about 15% to about 90% of the combined amounts of said A reactants, the amounts of said A and B reactants being sufficient to provide an $O_2$ permeability of less than the of poly(ethylene terephthalate) and a glass transition temperature in excess of poly(ethylene terephthalate).

6. A molded container formed from materials which comprise a linear copolyester, said copolyester being the copolyester of claim 1.

7. A molded container formed from materials which comprise a linear copolyester, said copolyester being the copolyester of claim 3.

8. A molded container formed from materials which comprise a lineaar copolyester, said copolyester being the copolyester of claim 4.

9. A molded container formed from materials which comprise a linear copolyester, said copolyester being the copolyester of claim 5.

10. The molded container of claim 6 wherein said container is a biaxially oriented container.

11. A clear molded container formed from an organic polymer having an oxygen permeability of less than about 7.0 cc.mil/100 in². day.atm., a carbon dioxide permeability of less than about 50.3 cc.mil/100 in ².day.atm. and a glass transition temperature in excess of about 121° C.

* * * * *